United States Patent [19]

Guenthner et al.

[11] Patent Number: 5,590,301
[45] Date of Patent: Dec. 31, 1996

[54] ADDRESS TRANSFORMATION IN A CLUSTER COMPUTER SYSTEM

[75] Inventors: Russell W. Guenthner, Glendale; Leonard Rabins, Scottsdale, both of Ariz.

[73] Assignee: Bull HN Information Systems Inc., Billerica, Mass.

[21] Appl. No.: 540,106

[22] Filed: Oct. 6, 1995

[51] Int. Cl.$^6$ .............................. G06F 9/26; G06F 9/34; G06F 12/00
[52] U.S. Cl. ........................................ 395/412; 395/419
[58] Field of Search .................................. 395/447, 449, 395/800, 410, 412, 419

[56] References Cited

U.S. PATENT DOCUMENTS

| | | | |
|---|---|---|---|
| 5,197,130 | 3/1993 | Chen et al. | 395/800 |
| 5,265,235 | 11/1993 | Sindhu et al. | 395/447 |
| 5,394,555 | 2/1995 | Hunter et al. | 395/449 |

Primary Examiner—Jack A. Lane
Assistant Examiner—Than V. Nguyen
Attorney, Agent, or Firm—J. S. Solakian; J. H. Phillips

[57] ABSTRACT

In order to achieve the integration of a plurality of processors, each capable of directly addressing a limited internal space storage range, with a larger external memory space (e.g., a mass memory), the processors are organized into clusters, each having a plurality of processors and a common secondary cache. Each cluster is assigned a two-bit cluster number. Intermediate a primary cache in each processor and the secondary cache in the cluster, an address translator is provided for effecting transformation between internal memory space addresses and external memory space addresses. The external memory space is divided into areas private to each cluster and shared by all the processors. An internal address indicator bit, in conjunction with the cluster number from a requesting processor primary cache, is employed to set up the transformation either to the private external space of that cluster or the shared external space. In the reverse external-to-internal transformation, a pair of indicator bits are employed to set up the generation of an internal address and an indicator that the external address defines either shared external space or private external space for the designated cluster. A cluster member number assigned to each processor is used by the secondary cache of each cluster to track which processor sends/receives information to/from the mass memory.

12 Claims, 5 Drawing Sheets

ADDRESS TRANSFORMATION IN A CLUSTER COMPUTER SYSTEM

FIELD OF THE INVENTION

This invention relates to the art of data processing and, more particularly, to addressing in a cluster computer system employing multiple clusters, each cluster having multiple processors, each processor being incapable of directly addressing all information stored in the total main memory.

BACKGROUND OF THE INVENTION

In the design of central processing units (CPUs) used in modern computing systems, improvements must take into account the command structure and the word length which often must remain the same as used in the predecessors to a "new" CPU. This is particularly true in the case of systems running under proprietary software operating systems. The fundamental reason for this constraint is the often enormous investment in software which a user may have. In some instances, there may be represented three decades of software development in a given user system, and a user typically wishes to merely load its old software on a new, improved hardware system and experience immediate higher performance results. As a result, CPU designers go to great lengths to maintain compatibility with earlier CPUs in a given operating system family.

Thus, in CPU design based on existing systems, even limited modification of the address range capability (i.e., allocation of address fields in a CPU instruction word) of each CPU would have a major impact on hardware design and, more especially, on the software which can or must be reused. This dilemma is faced in view of the ongoing increase in density and capacity of memory chips and other technologies that have resulted in the availability of mass memories capable of storing information which is one to two times greater than was contemplated at the time the address field lengths/word lengths were originally established in the operating system/CPU family.

Another factor involved in the design of CPUs, particularly CPUs intended to function under a long-established proprietary operating system, is the fact that ever-new technology allows an existing CPU design to be physically implemented into a much smaller space. However, again, the advantages of adhering to the fundamental specifications of existing operating system software (in order to permit the reuse of existing application software) directs the retention of the operating system, nothwithstanding its limiting effects on CPU design. Finally, and perhaps most importantly, those skilled in the art are aware of inefficiencies which occur when too many CPUs are operated in a single operating system environment.

All these factor are aggravated in a multiprocessor cluster environment in which multiple groups of multiple CPUs are incorporated into a large computer system which includes a large main memory containing stored information at more addresses than can be directly addressed by the individual CPUs, with the addressing constraint being imposed because of the address field/word length characteristics which are the natural heritage of the historical hardware and operating system/application software of a given computer system family. It is to the solution of this dilemma that the subject invention is directed.

OBJECT OF THE INVENTION

It is therefore a broad object of this invention to provide an improved multi-processor computer system incorporating extended memory addressing with total system memory beyond that seen by a single CPU or operating system.

It is a more specific object of this invention to provide an improved multiprocessor system employing a cluster architecture in which an external memory space, larger than that imherently directly addressable by the processors employed, is divided into private spaces for each multiprocessor cluster and shared spaces directly accessible by all the clusters according to an address transformation which incorporates cluster member number information for identifying each cluster and each member thereof.

SUMMARY OF THE INVENTION

Briefly, these and other objects of the invention are achieved, in an exemplary system which includes an external memory space (e.g., main memory) a power of two larger than the internal memory space which is inherently directly addressable by an address field generated/interpreted by the individual processors, by dividing the processors into multiple clusters with multiple processors in each. Each CPU in a cluster of processors, four on a single multiprocessor board in the example, is assigned a cluster number which is set, for example, by a two-bit number (thus identifying four clusters). In addition, each CPU is assigned a two-bit number (thus identifying four CPUs) setting which CPU it is in its cluster. In the example, the two two-bit numbers are concatenated to provide each CPU with a unique four-bit identification number in the system.

In an internal-to-external address transformation mode, the cluster number is sent, along with an internal address which includes an indicator bit specifying private/shared classification, from a requesting cluster to an address translator. In the address translator, the indicator bit is used to control the set up of the transformation.

In the exemplary system in which each CPU can inherently directly address one gigabyte (30 bit address field identified as bits 0–29 with bit 0 being the most significant), the available external space is two gigabytes and the length of the external space address field is 32 bits (bits 0–31, capable of specifying four gigabytes), bit 0 of the internal address is used as the indicator. If bit 0 is a "0", the cluster member is requesting information from its private area of external space; conversely, if it is a "1", the cluster member is addressing information in the shared regions of external space.

If the indicator bit is a "0", the cluster number is copied into bits 1, 2 of the external address, bits 1, 2 of the internal address are copied into bits 3, 4 of the external address and the lower order address bits 3–29 of the internal address are copied directly to bits 5–31 of the external address. The resulting is external address points to the specified private region in external space.

If, however, the indicator bit 0 in the internal address is a "1" indicating a call to a shared region of external space, then a different transformation takes place. CN0, CN1 are ignored. Bits 1, 2 of the internal address are copied to bits 1, 2 of the external address while bits 2, 3 of the external address are each forced to logic "1". The resulting external address points to the specified shared region in external space.

In an external-to-internal address transformation mode, bits 1, 2 of the external address are copied into positions CN0, CN1 of the internal address The external address indicator bits are bits 3, 4. If one or the other or both are "0", then an address from the private space of one of the clusters is indicated. Bit 0 of the internal address is forced to "0", and bits 3, 4 of the external address are copied to bits 1, 2 of the internal address. The lower order bits 5–31 of the external address are copied directly to bits 3–29 of the internal address. Thus, the developed internal address fully identifies an information block in external memory as that of the private space reserved to the cluster identified by CN0, CN1.

If both bits 3, 4 of the external address are "1", then the external space is known to be shared. Bit 0 of the internal address is forced to "1", bits 1, 2 of the external address are copied to bits 1, 2 of the internal address, and the lower order address bits are copied as before. The resulting internal address identifies an information block in external memory that is available to all the clusters.

DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figures 1, 3:
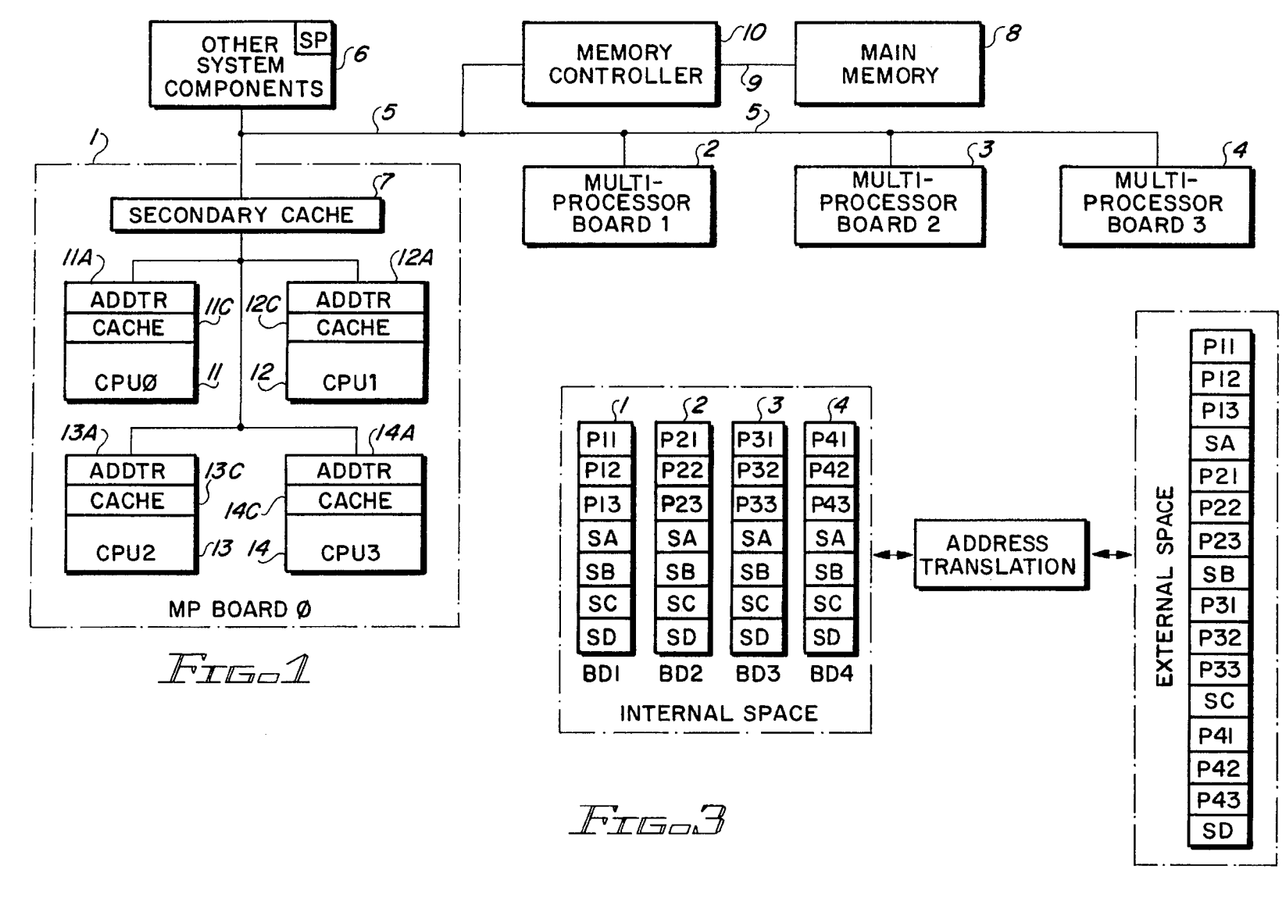
FIG. 1 is a high level block diagram of a cluster computer system in which the present invention may be practiced.
FIG. 3 is an exemplary representation of the allocation of internal address space as allocated to the individual multiprocessor clusters and external space representing the address space of a main memory device.

Referring first to the exemplary cluster computer system of FIG. 1, it will be observed that the system includes first 1, second 2, third 3 and fourth 4 multiprocessor circuit boards, each multiprocessor board including four CPUs effecting a cluster, each multiprocessor board being connected to a system bus 5 via an integral secondary cache 7. The system bus 5 couples the multiprocessor boards 1, 2, 3, 4 to one another and to various other system components (including a service processor "SP") represented by the block 6. In addition, system bus 5 couples the multiprocessor boards 1, 2, 3, 4 to a memory controller 10 which, in turn, interfaces via a memory bus 9 with a main memory 8 representative of one or more main memory devices.

As illustrated for multiprocessor board 1, each multiprocessor board 1, 2, 3, 4 includes four CPUs 11, 12, 13, 14. The four CPUs 11, 12, 13, 14 are provided with respective primary caches 11C, 12C, 13C, 14C. In the exemplary system, the primary caches on each multiprocessor board are each disposed between its directly associated CPU and a common secondary cache 7 and utilize the classical "store-into-cache" configuration. The secondary cache 7 interfaces with the system bus 5. Interposed intermediate each of the primary caches 11C, 12C, 13C, 14C and the common (to the cluster) secondary cache 7 are address translators 11A, 12A, 13A, 14A which are also constituents of their respective processors 11, 12, 13, 14.

In accordance with a preferred aspect of the invention, each of the multiprocessor boards 1, 2, 3, 4 constitutes a cluster, and each cluster runs under its own operating system to improve system efficiency.

Figure 2:
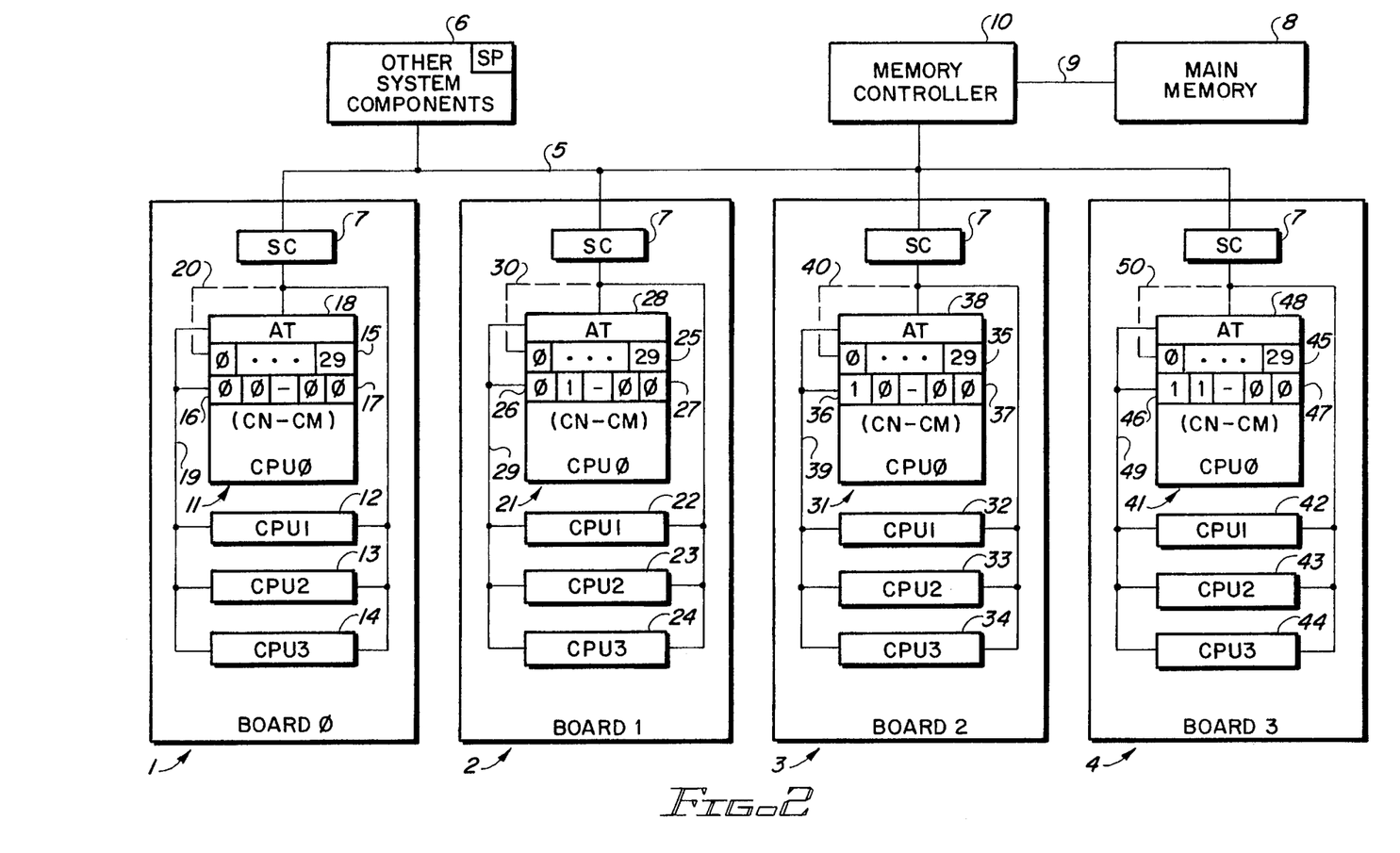
FIG. 2 is a block diagram of the system shown in FIG. 1 illustrating more detail of the individual clusters and CPUs.

Attention is now directed to FIG. 2 which illustrates the environment of the subject invention in more detail. Thus, it will be seen that CPU 11 on multiprocessor board 1 (board "0") communicates with the system bus 5 via an address register 15, address translator 18 and secondary cache 7. Register 15 is merely a convenient representation of address interface circuitry in the primary cache of the CPU 11 by which an address generated by the CPU 11 may be transmitted, transformed in the address translator 18, as a request to the secondary cache 7. This condition occurs when information required by the CPU 11 is not resident in at least one of the primary caches of the CPUs 11, 12, 13, 14 on the multiprocessor board 1. (Those skilled in the art will understand that, in many such multiprocessor configurations, it is possible for one CPU to "siphon" information from another CPU's primary cache.)

Corresponding CPUs 21, 22, 23, 24 are found on multiprocessor board 2 (board "1"). Similarly, corresponding CPUs 31, 32, 33, 34 and 41, 42, 43, 44 are found on multiprocessor boards 3 (board "2"), 4 (board "3"), respectively. In addition, registers 25, 35, 45, corresponding to register 15, are respectively found on multiprocessor boards 2, 3, 4. Also, address translators 28, 38, 48, corresponding to address translator 18, are respectively found on each of multiprocessor boards 2, 3, 4.

Also shown incorporated in the primary cache of CPU 11 on the multiprocessor board 1 are first and second two-bit identification registers, 16, 17, respectively. (It will be understood that the registers 16, 17 are representative of any convenient means for establishing a two-bit cluster identification for the multiprocessor board 1 and a two-bit cluster member identification for the CPU 11. For example, a cluster/cluster member identification could be hard-wired in or exist as four switches which can be set to a complete cluster member number.) In the case of CPU 11 in multiprocessor 1, the four stages of the registers 16, 17 are each set to the logic "0" position, thereby providing a cluster identification of "00" (board "0") and a cluster member identification of "00" (CPU "0"). As a practical matter, the registers 16, 17 may be concatenated and may be set upon system initialization under control of the service processor SP as represented by the dashed line 20.

Corresponding register pairs, 26, 27; 36, 37; and 46, 47 are provided on multiprocessor boards 2, 3, 4, for respective CPU0s 21, 31, 41 and are respectively set to provide cluster identifications of "01", "10" and "11" and, in each case, cluster member identification of "00".

In the succeeding discussion, the description will be directed to multiprocessor board 1 (board "0"), it being understood that multiprocessor boards 2, 3, 4 operate identically, taking into account their differing cluster number identifications as stored in the registers 26, 36, 46. I.e., the cluster member number for CPU2 33 on multiprocessor board 3 is "1010" (board "2"/CPU "2").

The 30-bit register 15 in the primary cache of the CPU 11 can specify one gigabyte of address locations which is the family limit of the exemplary CPUs. There is value in reserving a portion of the addressable space in main memory 8 to the private use of the CPUs on each multiprocessor board for, among other reasons, permitting each multiprocessor board to operate under an independent operating system. (These independent operating systems may be the same or different operating systems.) On the other hand, there is a need for establishing direct communication among the clusters and CPUs operating under the different operating systems in order that they can function with the full power of a cluster system architecture. One way in which this feature can be achieved is by providing shared memory space in main memory 8.

The present invention provides for the enjoyment of all these features while also permitting the collective direct and indirect address of more memory spaces in main memory than the CPUs in the system are individually inherently capable.

In the following discussion, the term "internal space" means the memory addressable by the CPUs on each multiprocessor board while the term "external space" means the total memory addressable; i.e., the memory space available in main memory 8. These two types of spaces exist at two interfaces of, and are reconciled by, the address translator 18 which, in the exemplary system, is disposed in the primary cache of each CPU.

The concept of internal and external spaces and private and shared memory in the present context may be better understood with reference to FIG. 3. In this example, it may be assumed that each CPU has a 30-bit address field and can therefore directly address one gigabyte. It may further be assumed that the available external memory in the exemplary main memory is two gigabytes and that the external address field is 32-bits long; i.e., capable of addressing four gigabytes.

A key aspect of the present invention is the manner in which addressable memory for each multiprocessor board is allocated. For the external memory space to be accessible, as a result of address transformation, by each multiprocessor board 1, 2, 3, 4, three-eighths of the inherently addressable internal space is private and one-half is shared. Comment on the apparently remaining one-eighth is reserved for discussion below.

Under these conditions, the memory allocation may be appreciated from an examination of FIG. 3. Multiprocessor board 1 enjoys ⅜ th gigabyte private memory space identified as ⅛ th gigabyte segments P11, P12, P13. In addition, Multiprocessor board 1 has access to ½ gigabyte shared memory space in ⅛ th gigabyte segments SA, SB, SC, SD. Similarly, Multiprocessor board 2 enjoys ⅜ th gigabyte private memory space identified as ⅛ th gigabyte segments P21, P22, P23. In addition, Multiprocessor board 2 has access to ½ gigabyte shared memory space in ⅛ th gigabyte segments SA, SB, SC, SD. The internal space for multiprocessor boards 3 and 4 are correspondingly assigned as shown in FIG. 3.

This internal space address information is provided to the address translation block which, as previously described, is present in the primary cache of each CPU, but is shown separately as a single block in FIG. 3 for clarity. In the address translation block, this address information is transformable, according to the invention, to obtain external space address segments distributed as shown schematically in FIG. 3.

Figure 4:
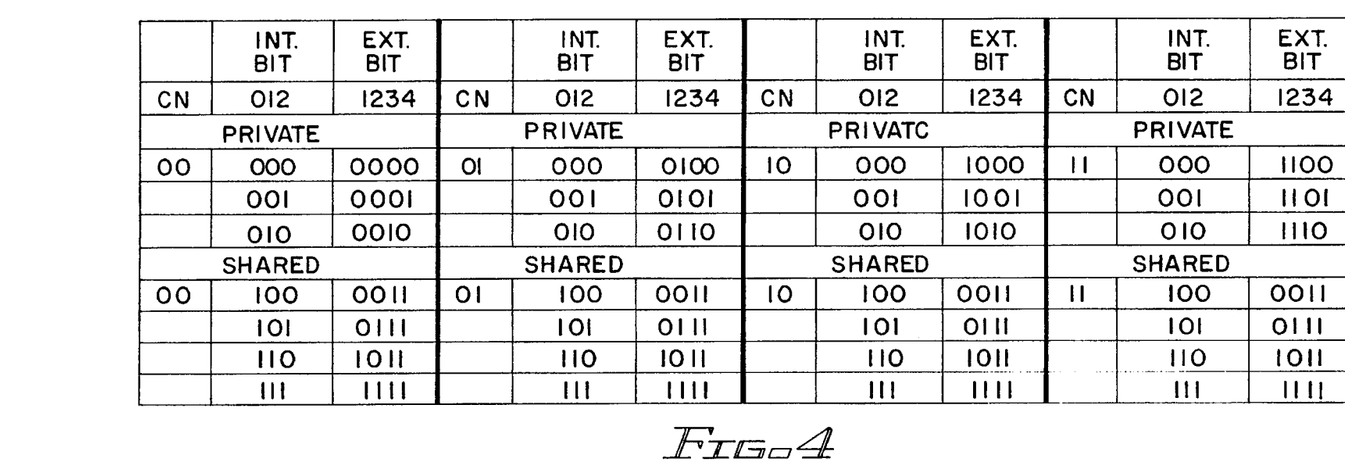
FIG. 4 is an exemplary transformation diagram illustrating an embodiment of the invention in which each CPU is inherently capable of addressing one gigabyte of information, and a main memory device in communication with all the CPUs is capable of storing two gigabytes of information.

Consider now an implementation of this example with reference to FIGS. 2, 4, 5, 6 and 7. FIG. 4 shows the higher order address bit distribution for the four multiprocessor boards for both the internal and external space addresses as they are transformed by the address translation block (e.g., the address translator 18 in FIG. 2). In each case, there are three columns representing, respectively, the cluster number (already set by the registers 16, 26, 36, 46; FIG. 2), the three most significant bits of the 30-bit internal address and the second, third, fourth and fifth most significant bits of the 32-bit transformed address. As will be discussed in more detail below, the most significant bit of the 32-bit transformed address is always a "0" in the example.

Figure 5:
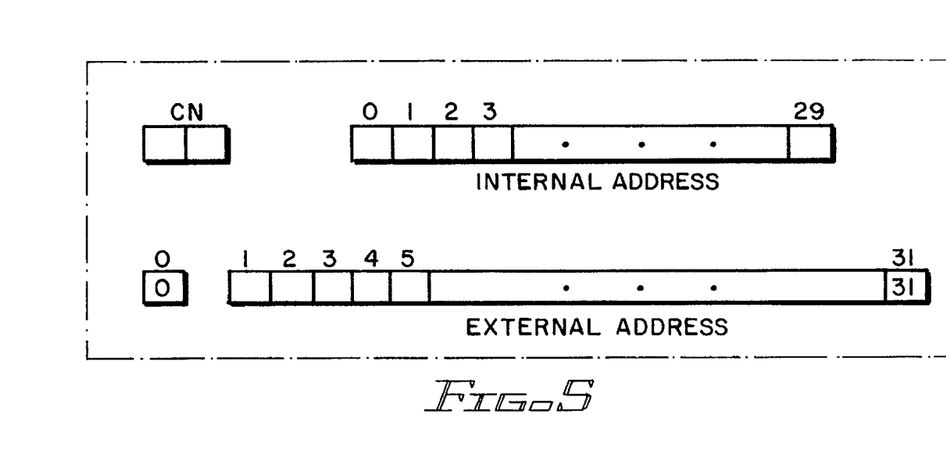
FIG. 5 is a representation of the two types of addresses, internal and external, which are transformed according to the invention.

Referring also to FIG. 5 and examining first the internal address pattern for multiprocessor board 1, the cluster number is preset to "00", the private space three most significant bits are "000", "001" and "010" and the shared space three most significant bits are "100", "101 ", "110" and "111". It will be noted that, in this example, the combination "011" for the three most significant bits is reserved. The three highest order internal address bits may be deemed the higher order segment of the processor address field and the remaining bits 3–29 may be deemed the lower order segment thereof.

Because the address field for external addresses has 32-bits and the main memory stores only two gigabytes, the most significant bit in the external addresses is always "0" in the example. (It may be noted, however, that this most significant bit is available to denote one of two complete systems which is to be granted access to a shared main memory.) Thus, the corresponding addresses, transformed into the five most significant bits of the private external space addresses to be transformed (i.e., bits 1, 2, 3, 4), are, respectively, "00000", "00001 ", "00010" (or P11, P12, P13) and those for the shared external space addresses are, respectively, "00011", "00111", "01011" and "01111" (or SA, SB, SC, SD). The five highest order external address bits may be deemed the higher order segment of the memory address field and the remaining bits 5–31 may be deemed the lower order segment thereof.

For multiprocessor board 2, the cluster number is preset to "01", the private space three most significant bits are, again, "000", "001" and "010" and the shared space three most significant bits are, again, "100", "101", "110" and "111" (Except for the cluster number, there is no difference, and this is also true for multiprocessor boards 3, 4 which have respective cluster numbers of "10" and "11"). The corresponding addresses, transformed into bits 1, 2, 3, 4 of the private external space addresses are, respectively, "00100", "000101", "000110" (or P21, 1322, P23) and those for the shared external space addresses are, respectively, "00011", "00111", "01011" and "01111" (or, again, SA, SB, SC, SD).

Similarly, the internal addresses of multiprocessor board 3 and 4 are respectively transformed to external addresses "01000" (P31 ), "01001" (P32), "01010" (P33) "00011" (SA), "00011" (SB), "01011" (SC), "01111" (SD) and "01100" (P41), "01101" (P42), "01110" (P43)"00011" (SA), "00111" (SB), "01011" (SC), "01111" (SD).

The basis of this transformation, which is different for the private and shared addresses, is not readily evident and requires further explanation. First, it will be noted that the most significant bit of each internal private address is "0" while the most significant bit of each internal shared address is "1". In the case of the private addresses, the CN of each microprocessor board (cluster) is utilized as bits 1 and 2 of the external address. Bit 0, known to be a "0", is not used directly in the transformation. Bits 1 and 2 of the internal address are, respectively, used as bits 3 and 4 of the external address.

In the case of the shared addresses, bit 0 of the internal address, known to be a "1", is not used directly in the transformation. Bits 1 and 2 of the internal address are used as bits 1 and 2 of the external address. Finally, bits 3 and 4 of the external address are set to "11".

In the discussion above, the term "used as" should only be understood as representative of the internal-to-external transformation process. The external-to-internal transformation, of course, reverses the process.

It will now be understood why the "011" internal address is not used with this particular addressing scheme; it would result in duplicate external address ranges for private and shared space according to the transformation process.

Figure 6:
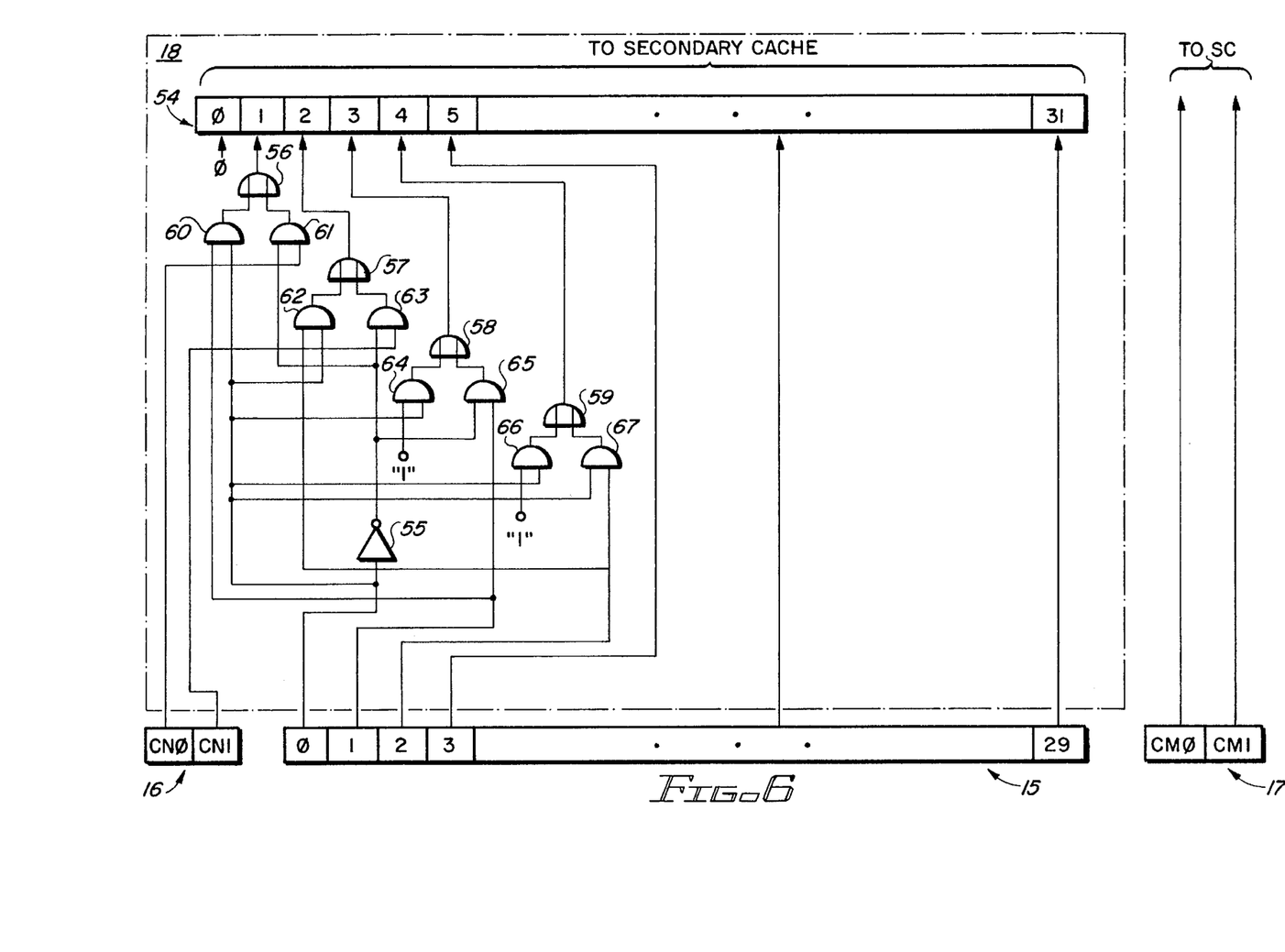
FIG. 6 is a simplified logic diagram illustrating the apparatus within an address translator component of each CPU operating in an in internal-to-external mode.
Figure 7:
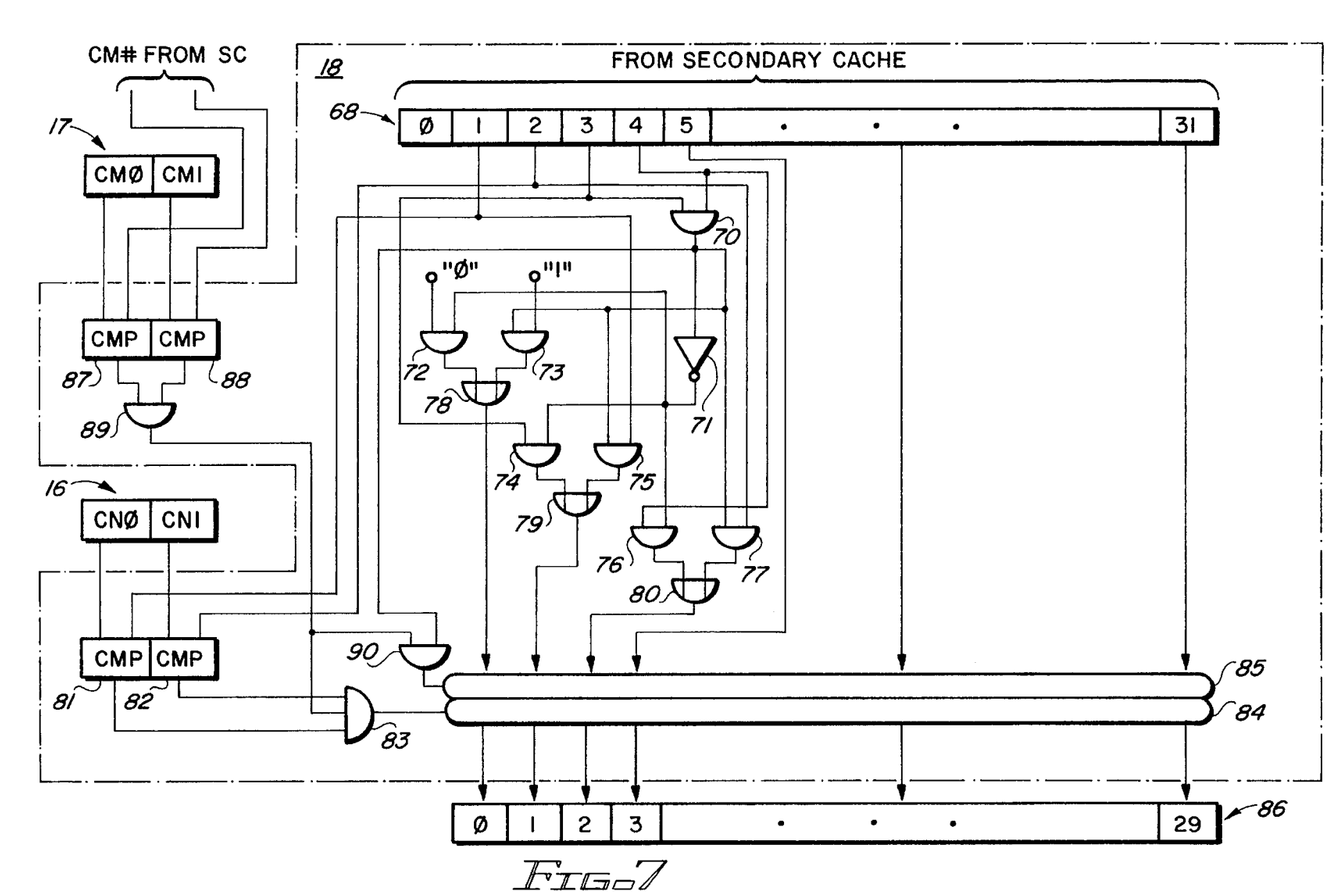
FIG. 7 is a simplified logic diagram of an address translator operating in an external-to-internal mode.

Exemplary transformation apparatus for the address translator 18 of CPU0 11 is shown in FIGS. 6 and 7. FIG. 6 illustrates this apparatus operating in the internal-to-external transformation mode in which an internal address, including a cluster number, is sent to the address translator 18 as a request from the primary cache directed to the secondary cache 7 (which, of course, will forward the request to main memory if the requested information is not resident in the secondary cache at the time of the request). The internal address is thus present in register 15 to serve as an input to the address translator in conjunction with the cluster number in register 16.

For this transformation, bit 0 of the internal address is key. If it is a "0", the address is identified as private to the requesting multiprocessor board which itself is identified by CN0, CN 1 in register 16. Bit 0 is inverted to a "1" by inverter 55, and the output of inverter 55 therefore enables one input each of AND-gates 61, 63, 65, 67. The other input to AND-gate 61 is CN0 which is therefore copied through OR-gate 56 into bit 1 of the external address in exemplary address translator output register 54. The other input to AND-gate 63 is CN1 which is therefore copied through OR-gate 67 into bit 2 of the external address. The other input to AND-gate 65 is bit 1 of the to internal address which is therefore copied, via OR-gate 58, to bit 3 of the external address in register 54. Similarly, the other input to AND-gate 67 is bit 2 of the internal address which is therefore copied, via OR-gate 59, to bit 4 of the external address in register 54. The lower order address bits 3–29 of the internal address in register 18 are directly copied to bits 5–31 of the external address in register 54. Bit 0 of the external address in register 54 is forced to logic "0" because external space is limited, in the example, to two gigabytes. As previously mentioned, this bit is available to accommodate two separate systems having access to the main memory.

Assuming by way of example that the address being transformed has been supplied by the primary cache of CPU0 11; i.e., CN0, CN1 are set to "00" and that bits 0,1,2 of the internal address are "010". In this example, the external space addressed after the transformation by the higher order address bits "00010" will be the ⅛ gigabyte private block identified in FIG. 3 as P13.

In another example, assume that bit 0 of an internal address sent to the address translator 18 is a logic "1" indicating a call to shared space. Since bit 0, in this instance, will be inverted to a logic "0" by the inverter 55, the AND-gates 61, 63, 65, 67 will be disabled. Instead, AND-gates 60, 62, 64, 66 will each have one input enabled as a result of the logic "1" present in bit 0 of register 53. The other input to AND-gate 60 comes from bit 1 of register 53 such that the logic level of bit 1 in the internal address is copied via OR-gate 56, into bit 1 of the external address in register 54. The other input to AND-gate 62 comes from bit 2 of register 53 such that the logic level of bit 2 in the internal address is copied, via OR-gate 57, into bit 2 of the external address in register 54.

The other inputs to each of the AND-gates 64, 66 are directly tied to logic "1" such that bits 3 and 4 of the external address in register 54 are set to "1" via OR-gates 58, 59, respectively. Again, bit 0 of the external address in register 54 is forced to "0" because of the two gigabyte limitation on external space in the example. Lower order address bits 3–29 of the internal address are directly copied into bits 5–31 of the external address as before.

Assume now that bits 0,1,2 of the internal address supplied by the multiprocessor board 1 are "111". In this example, the external space addressed, after the transformation by the higher order address bits "01111" will be the ⅛ gigabyte shared block identified in FIG. 3 as SD.

In the example, the CPU on a given multiprocessor board making a request to the secondary cache 7 is conventionally tracked by the secondary cache. Thus, the contents of the register 17 containing the cluster member number is sent to the secondary cache for that purpose.

FIG. 7 illustrates the address translator 18 operating in the external-to-internal address transformation mode. An external address from the secondary cache is placed in register 68, representative of any appropriate logic for the purpose. Bit 0 of the external address is not used because of the two gigabyte capacity of the main memory. Bits 1 and 2 are applied to AND-gates 75, 77 which respectively drive first inputs to OR-gates 79, 80. The outputs from OR-gates 79, 80 are respectively applied to bit positions 1 and 2 of corresponding inputs to multiplexer pair 84, 85 which selectively drive inputs to register 86 which is representative of any appropriate logic for interfacing the primary cache with the address translator. In addition, bits 1 and 2 in the register 68 are applied as respective inputs to comparators 81, 82 which have CN0 and CN1 in register 16 as their respective second inputs. If there is a match in both comparators 81, 82, this state confirms that cluster number "00" is the destination of the external address identified as private space reserved for one of the processors on multiprocessor board 1 (board "0") as determined by the status of bits 3 and 4 of the external address; i.e., if one or both of bits 3 and 4 are logic "0". With both comparators 81, 82 indicating a compare state, two of three inputs to AND-gate 83 are enabled. The third input to AND-gate 83 is driven by the output from AND-gate 89 which, in ram, is driven by the two outputs from comparators 87, 88. First respective inputs to the comparators 87, 88 are CM0, CM1 from register 17 while the second respective inputs thereto are the cluster member number received from the secondary cache which has conventionally previously recorded that CPU0 in the local cluster made the original request for access to the memory block identified by the external address. Thus, if there is a compare condition in all the comparators 81, 82, 87, 88, AND-gate 83 is fully enabled to enable the multiplexer 84 to transfer the transformed external-to-internal address to register 86.

Since private space is indicated in the example, one or the other of bits 3 and 4 in register 68 are "0", and AND-gate 70 is disabled such that its output is "0" and the output of inverter 71 is "1". This condition enables AND-gate 72 to transfer a logic "0", present at one of its inputs, through OR-gate 78, through multiplexer 84 and into bit 0 of register

86. Similarly, the output of inverter 71 enables AND-gate 74 to transfer bit 3 in register 68 through OR-gate 79, multiplexer 84 and into bit 1 of register 86. The output of inverter 71 also enables AND-gate 76 to transfer bit 4 in register 68 through OR-gate 80, multiplexer 84 and into bit 2 of register 86. Finally, bits 5–31 in register 68 are transferred through multiplexer 84 to bits 3–29 in register 86 to complete the external-to-internal transformation of the address information and the selection of the correct CPU in the correct cluster to receive requested information in the private storage area of the mass memory.

If both bits 3 and 4 of the external address are "1", a shared address is indicated, and AND-gate 70 is fully enabled. The resulting "1" at the output of AND-gate 70 enables one input each of AND-gates 73, 75, 77, 90. Since the indication is that the information is not private, there is no need to consider the cluster number. Thus, if the cluster member number from the secondary cache identifies CPU0 as previously described, the output from AND-gate 89 fully enables the AND-gate 90 to enable multiplexer 85 to transfer inputs thereto into the register 86.

Because the other input to AND-gate 73 is driven by a logic "1", a "1" is copied into bit 0 of register 86, via OR-gate 78 and multiplexer 85, to provide the internal address indicator for shared space. The other inputs to AND-gates 75, 76 are, respectively, from bits 1, 2 in register 68. As a result, the contents of bits 1, 2 in register 68 are copied into bits 1, 2 of register 86 via OR-gates 79, 80, respectively, and multiplexer 85. Bits 5–31 of the external address in register 68 are copied through multiplexer 85 into bits 3–29 of the internal address in register 86 as the lower order address bits common to the internal and external addresses.

It will now be understood, in the exemplary embodiment of the invention shown in FIGS. 6 and 7, that each multiprocessor board (cluster) loses the capacity to address ⅛ gigabyte of the one gigabyte inherently addressable by a 30 bit address field. However, what is gained is the ability to directly communicate among all the multiprocessor boards via the shared space. Further, there is achieved the ability of any multiprocessor board to indirectly address the private space of another multiprocessor board by sending a suitable request via shared space which results in the desired information being moved from private space into shared space. In addition, the previously discussed advantage of permitting each multiprocessor board to operate under its own operating system is achieved. Still further, the capability to enjoy the benefits of running separate operating systems in each cluster is facilitated and enhanced.

The example of FIGS. 3–7, inclusive is only one of many address transformations which may be established according to the present invention. For example, consider briefly a system in which each multiprocessor board can, as before, inherently directly address one gigabyte while the main memory can store four gigabytes. Then, bit 0 of the external address would come into play, and the logic of FIGS. 6 and 7 would be accordingly adjusted and expanded. In one simple configuration, the cluster number for each multiprocessor board may be extended to three bits with the most significant cluster number bit copied to and from bit 0 of the external address. This arrangement will expand the number of four-multiprocessor clusters which can be accommodated as well as expand the directly and indirectly addressable external memory. Alternatively, the clusters can be reduced to two multiprocessors per cluster (i.e., two cluster per multiprocessor board in the exemplary system). The result will be to use more external space as private space, each private space block being used by fewer processors. Thus, it will be understood that the address transformations available according to the invention are many and that the foregoing example treated in detail is only representative of one found to be especially applicable to a specific system in which the available external space was two gigabytes whereas the processors are limited to directly addressing one gigabyte. It has also been previously mentioned that bit 0 of the external address can be used a switch between two separate multicluster systems which access common mass memory.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A cluster computer system comprising:

A) a plurality of clusters, each said cluster including:
   1) a plurality of processors, each said processor having inherent limitations on the range of memory which is directly addressable by a processor address field, said processor address field being divided into higher order and lower order segments, each said processor including:
      a) a primary cache; and
      b) an address translator; and
   2) a secondary cache;

B) a memory having a capacity which exceeds the range each said processor is inherently capable of directly addressing, said memory being addressable by a memory address field, said memory address field exceeding said processor address field, said memory address field being divided into higher order and lower order segments;

C) means establishing a cluster number for each said cluster;

D) means coupling said plurality of clusters, via said secondary caches, to said memory; and E) each said address translator in each said processor in each said cluster being coupled between said primary cache in its said processor and said secondary cache in its said cluster, said address translator including first address translation logic responsive to processor address field and cluster number information in said primary cache in its said processor, said first translation logic comprising means responsive to the digital state of a predetermined indicator bit in said higher order segment of said processor address field by effecting one of two address transformations;
   1) if said predetermined indicator bit is a first digital value:
      a) forcing the two lowest order bits of said higher order segment of said memory address field to a first logic level;
      b) copying the two lowest order bits of said higher order segment of said processor address field to two higher order bits of said higher order segment of said memory address field; and
      c) copying the contents of said lower order segment of said processor address field to said lower order segment of said memory address field; thereby specifying a region of memory addressable by all said clusters; and 2) if said predetermined indicator bit is a second digital value:
   a) copying the two lowest order bits of said higher order segment of said processor address field to the two lowest order bits of said higher order segment of said memory address field;
   b) copying the cluster number to two higher order bits of said higher order segment of said memory address field; and
   c) copying the contents of the lower order segment of said processor address field to said lower order segment of said memory address field;
   thereby specifying a region of memory addressable only by the cluster identified by said cluster number.

2. The cluster computer system of claim 1 in which said higher order segment of said processor address field comprises three bits and in which said higher order segment of said memory address field comprises at least five bits.

3. The cluster computer system of claim 2 in which the most significant bit of said higher order segment of said processor address field is employed as said predetermined indicator bit.

4. The cluster computer system of claim 3 which further includes means for establishing a cluster member number for each said processor in each said cluster and in which said cluster member number of a specific processor is sent to said secondary cache in said cluster in which said specific processor resides when a memory request is made by said specific processor such that said secondary cache in said cluster in which said specific processor resides can identify which of said processors in its said cluster a response to said memory request is to be made.

5. A cluster computer system comprising:
   A) a plurality of clusters, each said cluster including:
      1) a plurality of processors, each said processor having inherent limitations on the range of memory which is directly addressable by a processor address field, said processor address field being divided into higher order and lower order segments, each said processor including:
         a) a primary cache; and
         b) an address translator; and
      2) a secondary cache;
   B) a memory having a capacity which exceeds the range each said processor is inherently capable of directly addressing, said memory being addressable by a memory address field, said memory address field exceeding said processor address field, said memory address field being divided into higher order and lower order segments;
   C) means establishing a cluster number for each said cluster;
   D) means coupling said plurality of clusters, via said secondary caches, to said memory; and
   E) each said address translator in each said processor in each said cluster being coupled between said primary cache in its said processor and said secondary cache in its said cluster, said address translator including second address translation logic responsive to memory address field information, said second translation logic comprising means responsive to the digital states of predetermined indicator bits in said memory address field, which predetermined indicator bits are of a lower order than the most significant bit thereof, by effecting one of two address transformations;
      1) if said predetermined indicator bits are both a first digital value:
         a) forcing a predetermined bit of said higher order segment of said processor address field to a first logic level;
         b) copying two higher order bits of said higher order segment of said memory address field to the two lowest order bits of said higher order segment of said processor address field; and
         c) copying the contents of the lower order segment of said memory address field to said lower order segment of said processor address field;
         thereby specifying a memory region containing information accessible by all said clusters; and
      2) if either of said predetermined indicator bits are a second digital value:
         a) comparing higher order bits, representing a target cluster, in said higher order segment of said memory address field to a cluster number;
         b) if said higher order bits in said higher order segment of said memory address field match said cluster number:
            i) copying the two lowest order bits of said higher order segment of said memory address field to the two lowest order bits of said higher order segment of said processor address field in at least one of said processors in said cluster identified by said cluster number; and
            ii) copying the contents of said lower order segment of said memory address field to said lower order segment of said processor address field in at least one of said processors in said cluster identified by said cluster number; and
         c) if said higher order bits in said higher order segment of said memory address field do not match said cluster number, inhibiting transfer of the contents of said memory address field to said processor address fields in all said processors in said cluster identified by said cluster number;
         thereby specifying a memory region containing information accessible only by the cluster specified by said cluster number.

6. The cluster computer system of claim 5 in which said higher order segment of said processor address field comprises three bits and in which said higher order segment of said memory address field comprises at least five bits.

7. The cluster computer system of claim 6 in which the two least significant bits of said higher order segment of said memory address field are employed as said predetermined indicator bits.

8. The cluster computer system of claim 7 which further includes means for establishing a cluster member number for each said processor in each said cluster and in which said cluster member number of a specific processor is sent to said secondary cache in said cluster in which said specific processor resides when a memory request is made by said specific processor such that said secondary cache in said cluster in which said specific processor resides can identify which of said processors in its said cluster a response to said memory request is to be made.

9. A cluster computer system comprising:
   A) a plurality of clusters, each said cluster including:
      1) a plurality of processors, each said processor having inherent limitations on the range of memory which is directly addressable by a processor address field, said processor address field being divided into higher order and lower order segments, each said processor including:
         a) a primary cache; and b) an address translator; and 2) a secondary cache;

B) a memory having a capacity which exceeds the range each said processor is inherently capable of directly addressing, said memory being addressable by a memory address field, said memory address field exceeding said processor address field, said memory address field being divided into higher order and lower order segments;

C) means establishing a cluster number for each said cluster;

D) means coupling said plurality of clusters, via said secondary caches, to said memory; and E) each said address translator in each said processor in each said cluster being coupled between said primary cache in its said processor and said secondary cache in its said cluster, said address translator including first address translation logic responsive to processor address field and cluster number in said primary cache in its said processor, said first translation logic comprising means responsive to the digital state of a first predetermined indicator bit in said higher order segment of said processor address field, which said first predetermined indicator bit is of a lower order than the most significant bit thereof, by effecting one of two address transformations;

1) if said first predetermined indicator bit is a first digital value:

a) forcing the two lowest order bits of said higher order segment of said memory address field to a first logic level;

b) copying the two lowest order bits of said higher order segment of said processor address field to two higher order bits of said higher order segment of said memory address field; and c) copying the contents of said lower order segment of said processor address field to said lower order segment of said memory address field;

thereby specifying a region of memory addressable by all said clusters; and 2) if said first predetermined indicator bit is a second digital value:

a) copying the two lowest order bits of said higher order segment of said processor address field to the two lowest order bits of said higher order segment of said memory address field;

b) copying the cluster number to two higher order bits of said higher order segment of said memory address field; and c) copying the contents of the lower order segment of said processor address field to said lower order segment of said memory address field;

thereby specifying a region of memory addressable only by the cluster identified by said cluster number; and F) said address translator further including second address translation logic responsive to memory address field information, said second translation logic comprising means responsive to the digital states of second and thirds predetermined indicator bits in said memory address field, which second and third predetermined indicator bits are of a lower order than the most significant bit thereof, by effecting one of two address transformations;

1) if said second and third predetermined indicator bits are both a first digital value:

a) forcing a predetermined bit of said higher order segment of said processor address field to a first logic level;

b) copying two higher order bits of said higher order segment of said memory address field to the two lowest order bits of said higher order segment of said processor address field; and c) copying the contents of the lower order segment of said memory address field to said lower order segment of said processor address field; thereby specifying a memory region containing information accessible by all said clusters; and 2) if either of said second and third predetermined indicator bits are a second digital value:

a) comparing higher order bits, representing a target cluster, in said higher order segment of said memory address field to a cluster number;

b) if said higher order bits in said higher order segment of said memory address field match said cluster number:

i) copying the two lowest order bits of said higher order segment of said memory address field to the two lowest order bits of said higher order segment of said processor address field in at least one of said processors in said cluster identified by said cluster number; and ii) copying the contents of said lower order segment of said memory address field to said lower order segment of said processor address field in at least one of said processors in said cluster identified by said cluster number; and c) if said hiker order bits in said higher order segment of said memory address field do not match said cluster number, inhibiting transfer of the contents of said memory address field to said processor address fields in all said processors in said cluster identified by said cluster number;

thereby specifying a memory region containing information accessible only by the cluster specified by said cluster number.

10. The cluster computer system of claim 9 in which said higher order segment of said processor address field comprises three bits and in which said higher order segment of said memory address field comprises at least five bits.

11. The cluster system of claim 10 in which the most significant bit of said higher order segment of said processor address field is employed as said predetermined indicator bit and in which the two least significant bits of said higher order segment of said memory address field are employed as said predetermined indicator bits.

12. The cluster computer system of claim 11 which further includes means for establishing a cluster member number for each said processor in each said cluster and in which said cluster member number of a processor is sent to said secondary cache in said cluster in which said specific processor resides when a memory request is made by said specific processor such that said secondary cache in said cluster in which said specific processor resides can identify which of said processors in its said cluster a response to said memory request is to be made.

* * * * *